US012463431B2

(12) United States Patent
Ozlemis et al.

(10) Patent No.: US 12,463,431 B2
(45) Date of Patent: Nov. 4, 2025

(54) UNSUPERVISED SOLAR ENERGY DISAGGREGATION SYSTEM AND METHOD

(71) Applicant: Siemens Aktiengesellschaft, Munich (DE)

(72) Inventors: Hakan Ozlemis, Princeton, NJ (US); Ulrich Muenz, Princeton, NJ (US); Siddharth Bhela, Kendall Park, NJ (US); Xiaofan Wu, North Brunswick, NJ (US); Michael Bernhard Buhl, Grafing (DE); Daniel Kloeser, Eckernfoerde (DE); Coral Siminovich, Oakville (CA)

(73) Assignee: Siemens Aktiengesellschaft, Munich (DE)

( * ) Notice: Subject to any disclaimer, the term of this patent is extended or adjusted under 35 U.S.C. 154(b) by 412 days.

(21) Appl. No.: 18/068,678

(22) Filed: Dec. 20, 2022

(65) Prior Publication Data
US 2024/0204530 A1  Jun. 20, 2024

(51) Int. Cl.
*H02J 3/38*      (2006.01)
*H02J 3/00*      (2006.01)

(52) U.S. Cl.
CPC ............. *H02J 3/381* (2013.01); *H02J 3/003* (2020.01); *H02J 3/004* (2020.01);
(Continued)

(58) Field of Classification Search
CPC .. H02J 3/381; H02J 3/003; H02J 3/004; H02J 2203/10; H02J 2203/20; H02J 2300/26;
(Continued)

(56) References Cited

U.S. PATENT DOCUMENTS 9,625,889 B2     4/2017  Cheng
10,630,502 B2 *  4/2020  Shyr ................... H04L 12/2825
(Continued)

FOREIGN PATENT DOCUMENTS

CN      114548516  A    5/2022
KR      20220157577 A   11/2022

OTHER PUBLICATIONS

Zhang, X. Y., Kuenzel, S., Guo, P., Yin, L., & Watkins, C. (2022). A hybrid data-driven online solar energy disaggregation system from the grid supply point. Complex & Intelligent Systems, 1-22.
(Continued)

*Primary Examiner* — Ziaul Karim (57) ABSTRACT

A computer-implemented method for solar energy disaggregation at a node of a distribution system includes obtaining first data including samples of averaged net power measured by a meter installed at the node and second data including samples of solar irradiation local to the node averaged over intervals temporally correlated with the first data. A physics-based model of the node is trained using the first and second data, to optimize a set of model parameters. The physics-based model is defined such that an average net power includes a composite of an average solar generation and an average power consumption at the node and the average solar generation is modeled as a function of an average solar irradiation. An aggregate solar generation at the node is estimated/predicted from actual irradiation data/irradiation forecast data local to the node using a model parameter optimized by the training.

12 Claims, 5 Drawing Sheets

(52) U.S. Cl.
CPC ....... *H02J 2203/10* (2020.01); *H02J 2203/20* (2020.01); *H02J 2300/26* (2020.01)

(58) Field of Classification Search
CPC ....... G06F 30/20; G06F 2119/06; G06N 3/08; H02S 50/00; G06Q 10/04
See application file for complete search history.

(56) References Cited

U.S. PATENT DOCUMENTS

| | | | | |
|---|---|---|---|---|
| 11,086,278 | B2* | 8/2021 | Morley | G05B 19/048 |
| 11,264,807 | B2* | 3/2022 | White | B60L 53/51 |
| 2014/0207298 | A1* | 7/2014 | Gupta | G05B 15/02 |
| | | | | 700/291 |
| 2015/0142347 | A1* | 5/2015 | Mohan | H02S 50/00 |
| | | | | 702/60 |
| 2016/0070286 | A1* | 3/2016 | Gupta | G05F 1/66 |
| | | | | 700/291 |
| 2017/0271877 | A1* | 9/2017 | Stewart | H02J 3/38 |
| 2020/0278650 | A1* | 9/2020 | Bernstein | G06T 7/00 |
| 2023/0307908 | A1* | 9/2023 | Sun | G06N 3/045 |

OTHER PUBLICATIONS

Sossan, F., Nespoli, L., Medici, V., & Paolone, M. (2018). Unsupervised disaggregation of photovoltaic production from composite power flow measurements of heterogeneous prosumers. IEEE Transactions on Industrial Informatics, 14(9), 3904-3913.

Wang, F., Ge, X., Dong, Z., Yan, J., Li, K., Xu, F., . . . & Tao, P. (2022). Joint energy disaggregation of behind-the-meter PV and battery storage: A contextually supervised source separation approach. IEEE Transactions on Industry Applications, 58(2), 1490-1501.

Chen, D., & Irwin, D. (May 2017). Sundance: Black-box behind-the-meter solar disaggregation. In Proceedings of the eighth international conference on future energy systems (pp. 45-55).

Kreuwel, F., van Lohuizen, K., & van Heerwaarden, C. (2019). Disaggregating Grid Load into Consumption and Solar Generation.

Liu, S., Maldonado, D. A., & Constantinescu, E. M. (2020). Probabilistic analysis of masked loads with aggregated photovoltaic production. Electric Power Systems Research, 189, 106670.

Kara, E. C., Roberts, C. M., Tabone, M., Alvarez, L., Callaway, D. S., & Stewart, E. M. (2016). Towards real-time estimation of solar generation from micro-synchrophasor measurements. arXiv preprint arXiv:1607.02919.

Chen, X., & Ardakanian, O. (2022). Data efficient energy disaggregation with behind-the-meter energy resources. Sustainable Energy, Grids and Networks, 32, 100813.

Bu, F., Dehghanpour, K., Yuan, Y., Wang, Z., & Guo, Y. (2021). Disaggregating customer-level behind-the-meter PV generation using smart meter data and solar exemplars. IEEE Transactions on Power Systems, 36(6), 5417-5427.

* cited by examiner

UNSUPERVISED SOLAR ENERGY DISAGGREGATION SYSTEM AND METHOD

TECHNICAL FIELD

The present disclosure relates to solar energy disaggregation in power distribution systems. In particular, embodiments of the disclosure relate to systems and methods for estimating or predicting an aggregate solar generation at a node of a distribution system in an unsupervised process.

BACKGROUND

In modern power distribution systems, the share of solar generators, e.g., including photovoltaic cells (PVs), is rapidly increasing. However, due to technical and regulatory restrictions and lack of costly measurement equipment, distribution system operators (DSOs) are often unable to separately measure behind-the-meter generation and consumption of customers. The actual solar generation and power consumption usually counteract on each other and may not be directly observable from net power measurements. This can limit the DSOs' ability to estimate installed solar power capacity and forecast future solar generation. The lack of this information may hamper efficient grid planning and operation as well as decision-making on the energy market.

The problem of separating the measured net power into its components, including solar generation and power consumption, is referred to as solar energy disaggregation.

In research, a widely studied approach to the problem of solar energy disaggregation is based on supervised learning, i.e., with an assumption of available labeled data including separate measurements of solar generation and power consumption to use as reference. These methods have used machine learning or optimization schemes to approximate ground truth time series, which are in practice expensive or unrealistic to acquire, and furthermore cannot be generalized to different geographic regions.

In practice, solar generation can be estimated based on assumed knowledge of installed PV capacity in a region. However, this assumption is often not accurate or reliable. For example, many consumers may not report their installed PV capacity to a DSO, and/or the installed PV capacity in the region may not be accurately tracked by the DSO.

SUMMARY

Briefly, aspects of the present disclosure provide a system and a method for solar energy disaggregation that can estimate or predict an aggregate solar generation at a node of a distribution system from solar irradiation data using a trained physics-based model of the node, without requiring prior separate measurement of solar generation and consumption or knowledge/assumption of installed PV capacity.

A first aspect of the disclosure provides a computer-implemented method for estimating or predicting an aggregate solar generation at a node of a distribution system. The method comprises obtaining, by a computing system comprising one or more processors, first data pertaining to a net power measured by a meter installed at the node, the first data comprising a number of samples of net power averaged over a defined interval, and second data pertaining to a solar irradiation local to the node, the second data comprising a number of samples of solar irradiation averaged over intervals temporally correlated with the first data. The method comprises training, by the computing system, a physics-based model of the node using the first and second data, to optimize a set of model parameters. The physics-based model is defined such that an average net power includes a composite of an average solar generation and an average power consumption at the node and the average solar generation is modeled as a function of an average solar irradiation. The method then comprises estimating or predicting, by the computing system, an aggregate solar generation at the node from an input respectively comprising actual irradiation data or irradiation forecast data local to the node, using a model parameter optimized by the training.

Further aspects of the disclosure are directed to computing systems and computer program products including instructions executable by a processor to carry out the above-described method and its optional embodiments.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Figure 1:
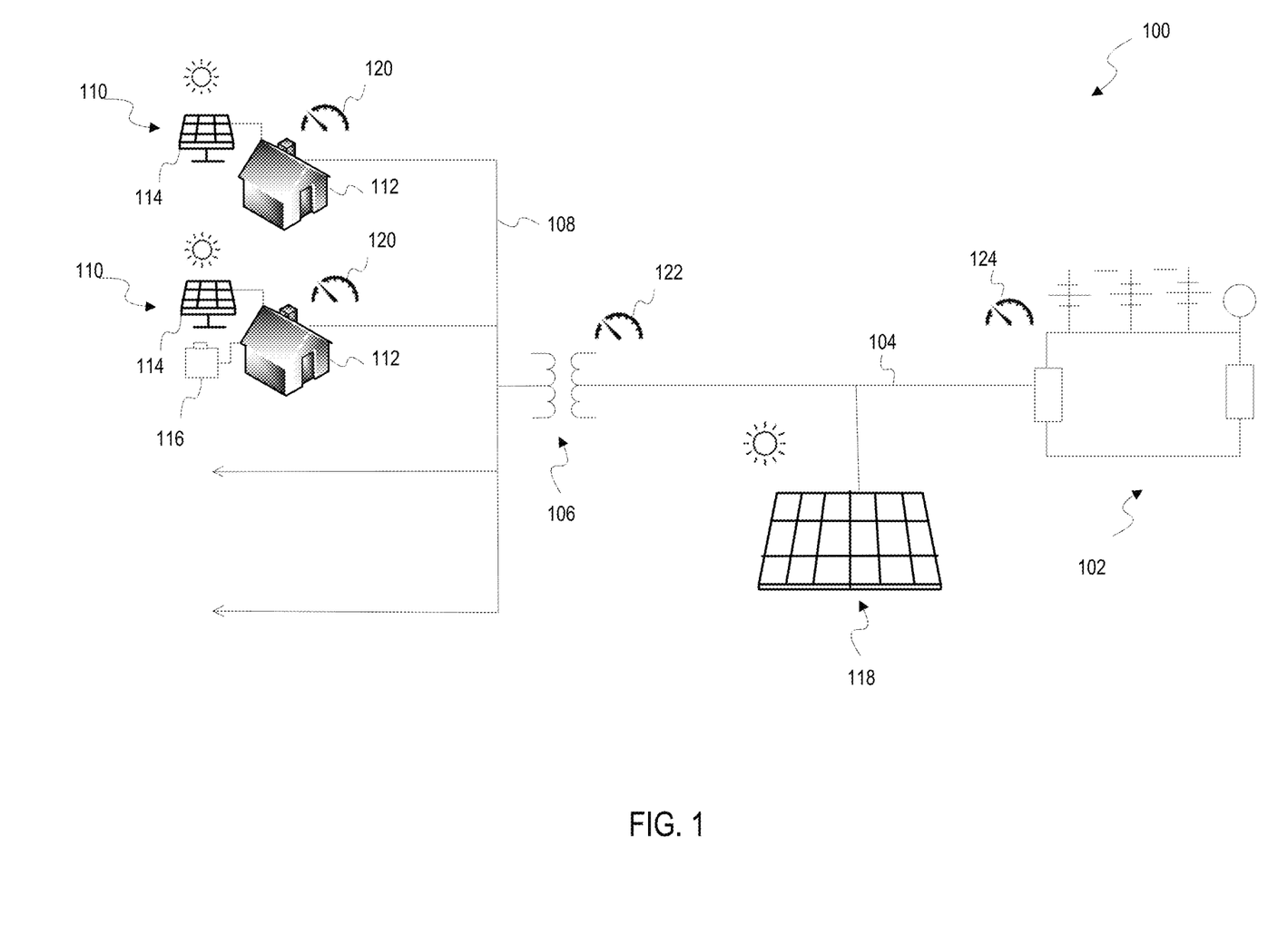
FIG. 1 illustrates an example of a power distribution system including solar generators, wherein aspects of the present disclosure can be used for solar energy disaggregation at different levels of the distribution system.

A non-limiting example of a distribution system where the disclosed methodology can be implemented is shown in FIG. 1. In the shown example, the distribution system 100 has a radial tree topology. As shown, the distribution system 100 may include a distribution substation 102 that may receive power from a transmission network via a step-down transformer (not shown). The stepped-down voltage from the distribution substation 102 may be carried by one or more feeders 104 to a respective distribution transformer 106, one of which is shown in FIG. 1. The distribution transformer 106 typically provides the final voltage transformation in the distribution system 100, stepping down the voltage used in the feeder 104 to the level used by end consumers. Output from the distribution transformer 106 may be carried by a distributor conductor 108, from which, tapings may be taken for power supply to end consumers 110, which may include a number of residential (or commercial) buildings or houses 112, among others.

The distribution system 100 may include a number of solar generators, among other electricity generators. For example, as shown in FIG. 1, some of the buildings 112 may have installed thereon small-scale PV systems 114 (e.g., rooftop PVs). Continuing with the shown example, one or more of the buildings 112 may further include a battery energy storage system (BESS) 116 coupled to the PV system 114. Furthermore, as shown, the distribution system 100 may also include one or more large-scale PV systems 118 (e.g., solar parks), which may be coupled to a feeder 104. Although not shown, in some examples, a large-scale PV system 118 may be coupled to a feeder 104 via a transformer.

A DSO, such as a power utility, may have access to historical and/or real-time measurements of power at various levels of the distribution system 100 via meters installed at different locations. For example, as shown, such meters may include household/residential meters 120 installed respectively at individual buildings 112, meters 122 installed respectively at one or more distribution transformers 106, and a meter 124 installed at the distribution substation 102. Although not shown, meters for measuring power may also be installed at other locations, such as distribution lines, etc.

The integration of PV systems 114, 118 can decrease the visibility of the power distribution system 100. For example, most rooftop PV systems 114 are behind-the-meter, which means that the solar generation by these PV systems 114 cannot be recorded by household meters 120. That is, the household meters 120 may only measure a net power consumption at the respective building 112 but may not be able to separately measure solar generation by the installed PV system 114 and the actual power consumption in the building 112. The BESS 116 may also be behind-the-meter, and hence its charging/discharging power may not be separately measured by a household meter 120. Although PV meters can be installed in some countries to measure solar generation, the consumers may choose to not report their PV generation to the DSO, and/or may install additional PV panels which are not registered. As a consequence, meters located at higher-level nodes in the distribution system 100, such as meters 122 and 124, cannot be used to estimate aggregate solar generation at the respective nodes from the measured net power at these nodes. Furthermore, in some cases, due to the absence of costly measurement equipment, solar generation by the large-scale PV system 118 also may not be directly measurable.

Thus, a DSO may not have knowledge of how much PV capacity is installed in a region. The region can be behind the distribution substation 102 (which may comprise thousands of consumers) or at a lower level behind a distribution transformer 106 (including fewer consumers). A lack of visibility can limit demand-side management, including the scheduling of short-term operations implemented by the DSO, and can further limit cost-efficient transformer/substation sizing, line planning, risk analysis and situational awareness.

The disclosed methodology can be implemented to carry out solar disaggregation, i.e., decoupling a measured net power $P_{net}$ to solar generation $P_{PV}$ and power consumption $P_c$, in an unsupervised process, without a foreknowledge about the installed PV capacity and separately measured time series data of $P_{PV}$ and $P_c$. Furthermore, at least some of the disclosed embodiments can provide a solution that is generic to perform solar energy disaggregation and forecasting at nodes at various levels (e.g., at the distribution substation, at a distribution transformer or at a building), to provide layered visibility of the distribution system.

The disclosed methodology involves training a physics-based model of a specific node or grid segment (e.g., a distribution substation, a distribution transformer, a building, or other), using as input only averaged net power measurements at the node and solar irradiation data pertaining to the node, and in some embodiments, additionally including averaged temperature data pertaining to the node, to optimize a set of model parameters. The physics-based model is defined such that, at the node, an average net power includes a composite of an average solar generation and an average power consumption at the node and the average solar generation is modeled as a function of an average solar irradiation. Once the model is trained, an aggregate solar generation at the node can be estimated/predicted using as input only irradiation data pertaining to the node, utilizing a model parameter optimized by the training.

In this description, the term "local to the node" can refer to the precise location of the node, or a broader geographical region where the node is located. The "aggregate solar generation" at a node includes an aggregate of solar power generated by solar generators (including small and large-scale PV systems) installed at or downstream of the node in the distribution system. When the node is an individual building, the aggregate solar generation includes only the solar power generation by a PV system installed at the building.

Embodiments of the disclosed methodology are described hereinbelow referring to FIGS. 2-4. The various modules described herein, including the model trainer 210 (FIG. 2) and the solar generation estimator/predictor 404 (FIG. 4), including components thereof, may be implemented in a computing environment in various ways, for example, as hardware and programming. The programming for the modules 210, 404 may take the form of processor-executable instructions stored on non-transitory machine-readable storage mediums and the hardware for the modules may include processors to execute those instructions. The processing capability of the systems, devices, and modules described herein, including the model trainer 210 and the solar generation estimator/predictor 404, may be distributed among multiple system components, such as among multiple processors and memories, optionally including multiple distributed processing systems or cloud/network elements.

Figure 2:
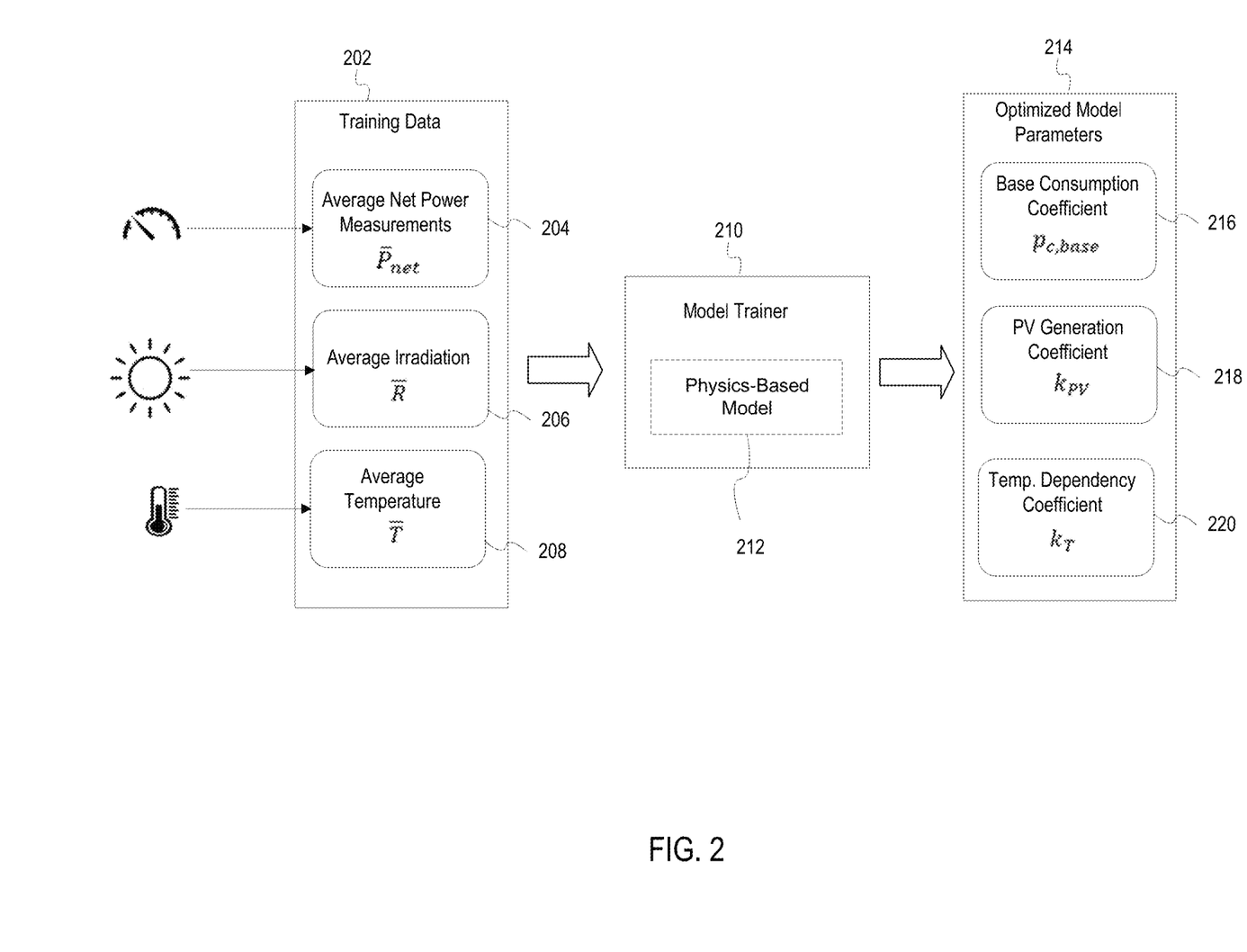
FIG. 2 is a schematic diagram illustrating training of a physics-based model of a distribution system node for solar energy disaggregation according to an example embodiment of the disclosure.

Referring to FIG. 2, in a first step, the model trainer 210 is executed by a computing system to train a physics-based model 212 of a specified node of the distribution system, using training data 202 pertaining to the node, to output a set of optimized model parameters 214.

The training data 202 includes first data 204 pertaining to a net power measured by a meter installed at the node. The first data 204 includes a number of samples of net power $\overline{P}_{net}$ averaged over a defined interval. The training data 202 also includes second data 206 pertaining to a solar irradiation local to the node. The second data includes a number of samples of solar irradiation $\overline{R}$ averaged over intervals temporally correlated with the first data 204. Irradiation data may be obtained based on local measurements, for example via a pyranometers, pyrheliometers, sunshine recorders, etc., or may be estimated based on satellite data. In some embodiments, the irradiation data may include averaged quantities pertaining different irradiation types, such as direct, diffuse, reflected, etc. According to a disclosed embodiment, the training data 202 may additionally include third data 208 pertaining to a temperature local to the node. The third data 208 may include a number of samples of temperature T averaged over intervals temporally correlated with the first data 204. Temperature data may include measured or estimated temperatures local to the node.

According to disclosed embodiments, the training data 202 used by the model trainer 210 may include low-resolution averaged quantities. It has been recognized that averaging a daily pattern may be sufficient to capture the change of consumption and generation trends through different seasons. The averaging interval may hence typically include a one-day period. In some embodiments, a daily pattern may be captured by extending the averaging interval over multiple days. Training the physics-based model 212 based on a daily trend can make the model robust to instantaneous electricity consumption changes, which otherwise can require complex random process modeling, and can further make the model generalizable for different levels of nodes, thanks to the minimized effort for consumption modeling, which can otherwise require different model parameters for different grid levels. However, embodiments of the disclosed methodology may be implemented with other averaging intervals, which can include, for example, a fraction of a one-day interval (e.g., 12 hours, 8 hours, 6 hours, etc.), or even shorter intervals.

The disclosed methodology may thus require minimal and cost-effective training data 202. For example, the required training data 202 can be readily captured using the available equipment of DSOs as most of the DSOs already monitor net power and weather conditions (e.g., global horizontal irradiance (GHI) and temperature). In contrast, existing techniques for solar energy disaggregation typically require costly equipment to gather high-resolution data, detailed irradiation components like direct normal and direct horizontal irradiation, knowledge about installed PV capacity at reference nodes and measurements from the reference PV installations.

An example embodiment of the physics-based model 212 will now be described using certain notations as explained below. In this description, lower-case notations denote decision variables, whereas upper-case notations denote measured or modeled quantities. The notations with an overline refer to averaged quantities. Without loss of generality, the averaging interval used in the modeling according to the disclosed embodiments includes a one-day interval, denoted by d.

The physics-based model 212 may be defined by exploiting a linear relationship between the measured net power $P_{net}$ at the node and its components, namely the solar generation $P_{PV}$ (also referred to as PV output) and the power consumption $P_c$, as given by equation (1), where t denotes time:

$$P_{net}(t)=P_c(t)-P_{PV}(t) \quad (1)$$

The solar generation $P_{PV}(t)$ at the node may be assumed to be linearly related to the irradiation R(t) local to the node for any time t with a linear coefficient $k_{PV}$, as given by equation (2):

$$P_{PV}(t)=k_{PV}\cdot R(t) \quad (2)$$

To prevent degradation of regression accuracy due to highly volatile electricity consumption, which can otherwise require complex random process modeling, the disclosed embodiment is grounded on regression on daily averaged quantities for a day d. Equations (1) and (2) may thus be reformulated as:

$$\overline{P}_{net}(d)=\overline{P}_c(d)-\overline{P}_{PV}(d) \quad (3)$$

$$\overline{P}_{PV}(d)=k_{PV}\cdot \overline{R}(d) \quad (4)$$

Without loss of generality, the daily average solar generation $k_{PV}\cdot\overline{R}(d)$ may be split into subcomponents to further refine the relationship between solar generation and irradiation. For example, in one embodiment, the coefficient $k_{PV}$ may comprise multiple components assigned to respectively multiple intervals of average irradiation over a day (e.g., morning, noon and afternoon). In another embodiment, the coefficient $k_{PV}$ may comprise multiple components assigned to respectively multiple types of irradiation (e.g., direct irradiation, diffuse irradiation and reflected irradiation). In such embodiments, the coefficient $k_{PV}$ may include a vector of decision variables for determining the PV output. The total PV output as per equation (4) may thus include a linear combination of PV outputs determined by the decision variables in the vector $k_{PV}$.

In one embodiment, the power consumption at the node may be modeled by considering a thermal energy demand. In this case, the physics-based model may be defined such that the average power consumption at the node is modeled as a function of an average temperature. For example, the average power consumption at the node may be modeled as a sum of a base power consumption and an average temperature dependent power consumption at the node, which is a function of an average temperature $\overline{T}$ local to the node. According to a disclosed embodiment, a temperature dependency coefficient $k_T$ may be introduced for determining a daily average temperature dependent power consumption, which may be added on to a daily base power consumption $p_{c,base}$, as given by equation (5), where $k_T$ and $p_{c,base}$ are also decision variables:

$$\overline{P}_c(d)=p_{c,base}+k_T\cdot\overline{T}(d) \quad (5)$$

In the disclosed embodiment, the coefficient $k_T$ defines a linear relationship between the average temperature and the average temperature dependent power consumption. In other embodiments, the relationship may be non-linear (e.g., quadratic).

Again, without loss of generality, $k_T\cdot\overline{T}(d)$ can be split into two different subcomponents to model increasing cooling and heating demand for hot and cold days above or below a threshold temperature, respectively. In one embodiment, $k_T$ may include a first component $k_{cool}$ defining a relationship between the average temperature and the average temperature dependent power consumption when the average temperature is above a threshold temperature, and a second component $k_{heat}$ defining a relationship between the average temperature and the average temperature dependent power consumption when the average temperature is below the threshold temperature.

Figure 3:
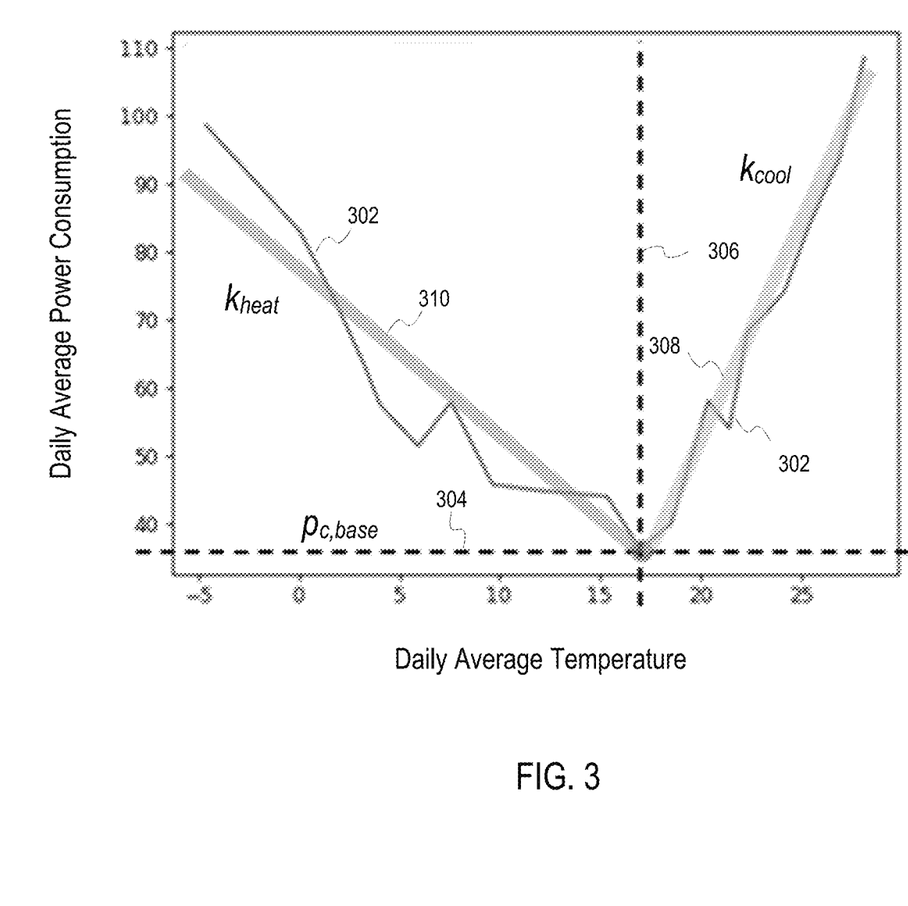
FIG. 3 shows a graph illustrating modeling of temperature dependence of power consumption at a distribution system node according to an example embodiment.
Figure 4:
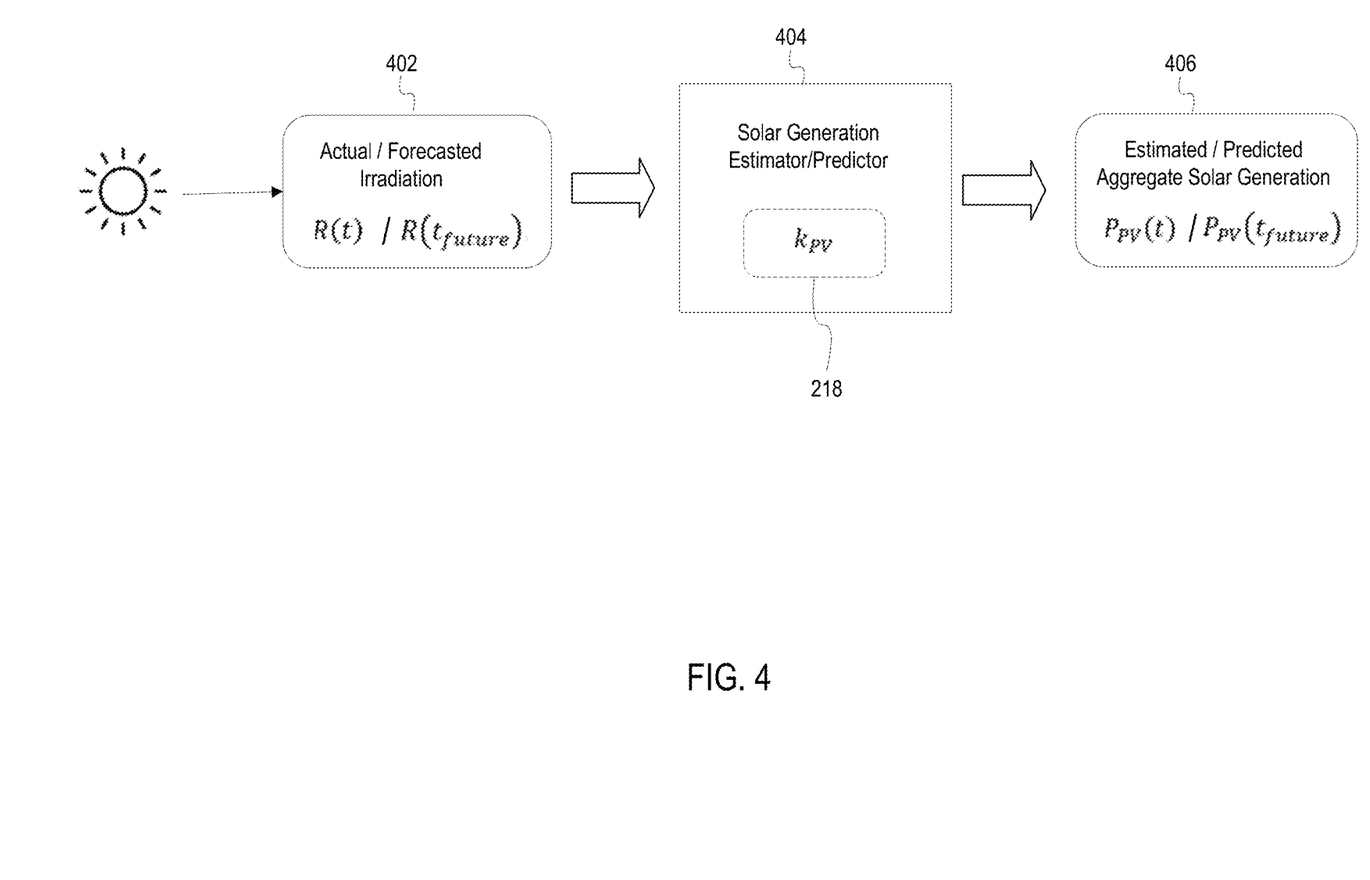
FIG. 4 is a schematic diagram illustrating estimation/prediction of aggregate solar generation at a distribution system node from irradiation data using a trained physics-based model according to an example embodiment.

FIG. 3 illustrates the modeling of temperature dependence of power consumption according to an example embodiment. Here, the curve 302 plots a variation of daily average power consumption at a distribution system node with daily average temperature. As shown, the daily average power consumption is minimum when the daily average temperature equals a threshold temperature. This minimum or daily average power consumption $p_{c,base}$ is indicated by the dashed line 304 and the threshold temperature is indicated by the dashed line 306. As the daily average temperature exceeds the threshold temperature 306, the daily average power consumption increases due to increased cooling demand. Likewise, as the daily average temperature falls below the threshold temperature 306, the daily average power consumption increases due to increased heating demand. In this example, the first component of $k_T$, namely $k_{cool}$, is used to define a linear relationship (shown by the linear fit 308) between the daily average power consumption and daily average temperature, for daily average temperatures above the threshold temperature 306. The second component $k_{heat}$ is used to define a linear relationship (shown by the linear fit 310) between the daily average power consumption and daily average temperature, for daily average temperatures below the threshold temperature 306. In this case, the temperature dependent power consumption $k_T \cdot T(d)$ in equation (5) may be expressed as a piece-wise linear function using the components $k_{cool}$ and $k_{heat}$ of $k_T$ as illustrated in FIG. 3.

Using equations (4) and (5), equation (3) may be reformulated as:

$$\overline{P}_{net}(d) = p_{c,base} + k_T \cdot \overline{T}(d) - k_{PV} \cdot \overline{R}(d) \qquad (6)$$

The solar energy disaggregation problem may thus be transformed into one where the average net power $\overline{P}_{net}(d)$ may be approximated using exogenous inputs, namely average irradiation $\overline{R}(d)$ and average temperature $\overline{T}(d)$ local to the node.

Continuing with reference to FIG. 2, according to a disclosed embodiment, the physics-based model 212 may include a regression model, which may be formulated as:

$$\min_x \|Ax - b\|$$

$$\text{with } b = \begin{pmatrix} \overline{P}_{net}(1) \\ \vdots \\ \overline{P}_{net}(n) \end{pmatrix}, A = \begin{pmatrix} 1 & \overline{T}(1) & -\overline{R}(1) \\ \vdots & \vdots & \vdots \\ 1 & \overline{T}(n) & -\overline{R}(n) \end{pmatrix}, \text{ and } x = \begin{pmatrix} p_{c,base} \\ k_{TPV} \\ k_T \end{pmatrix},$$

where n is the number of training days.

The model trainer 210 may be configured to use data samples from the first data 204, second data 206 and third data 208 to train the above-described regression model, to optimize the model parameters 214. The set of optimized model parameters 214 in this case may include a first model parameter 216 which is the base power consumption $p_{c,base}$, a second model parameter 218 which is the coefficient $k_{PV}$ defining a linear relationship between the average solar irradiation and the average solar generation at the node, and a third model parameter 220 which is the coefficient $k_T$ defining a relationship between the average temperature and the temperature dependent average power consumption. A physics-based model including a regressor, as described above, may provide a high degree of physical interpretability as compared to purely data driven models.

The embodiments disclosed above are based on a consideration of temperature dependency of power consumption for disaggregation of solar energy, which can improve the estimation/prediction accuracy significantly. In an alternate embodiment, the temperature dependency consideration may be obviated. The training data 202 may then include only the first data 204 and the second data 206. The physics-based model 212 may be defined such that the average power consumption is modeled as a function of the base power consumption without including the average temperature dependent power consumption $k_T \cdot T(d)$. For example, in a simple approximation, the terms involving $k_T$ and $\overline{T}(d)$ may be eliminated from equations (5) and (6) and consequently from the regression model described above. Such an embodiment may be suitable when temperature data for a node is not available and/or when a high accuracy of solar generation estimation/prediction is not necessary (e.g., for qualitatively detecting presence of solar generation behind a node).

Once the physics-based model has been trained, one or more of the optimized model parameters may be incorporated into a solar generation estimator/predictor module that can be used to estimate/predict an aggregate solar generation at the node using irradiation data pertaining to the node. Referring to FIG. 4, a solar generation estimator/predictor 404 according to the disclosed embodiments may incorporate the optimized second model parameter 218 ($k_{PV}$). The solar generation estimator/predictor 404 may be executed by a computing system to process an input 402 comprising irradiation data pertaining to the node to produce an output 406 indicating aggregate solar generation at the node, using the optimized $k_{PV}$.

In the proposed solar generation estimator/predictor 404, the optimized $k_{PV}$ can be used with the relation in equation (2) in two ways. In a first implementation, the input 402 may comprise actual (e.g., historical or current) irradiation R(t) local to the node. In this case, the solar generation estimator/predictor 404 can utilize the optimized $k_{PV}$ to output an estimated aggregate solar generation $P_{PV}(t)$ at the node using equation (2), and may further use this estimate to disaggregate historical or current net power $P_{net}(t)$ into power consumption $P_c(t)$ and solar generation $P_{PV}(t)$, using equation (1). In a second implementation, the input 402 may comprise forecasted irradiation $R(t_{future})$ local to the node. In this case, the solar generation estimator/predictor 404 can use the optimized $k_{PV}$ to output a predicted aggregate solar generation $P_{PV}(t_{future})$ at the node. The predicted solar generation $P_{PV}(t_{future})$ may determined by computing a product of the optimized $k_{PV}$ with the forecasted irradiation $R(t_{future})$, analogous to equation (2).

A key feature realized by the disclosed embodiments is that the model parameter $k_{PV}$, which may be optimized using low-resolution training data (e.g., comprising daily averages), can still be exploited to estimate or predict aggregate solar generation from high-resolution time series irradiation data, without additional modeling effort. Thus, according to one embodiment, the actual irradiation data R(t) or irradiation forecast data $R(t_{future})$, and respectively the estimated solar generation $P_{PV}(t)$ or predicted solar generation $P_{PV}(t_{future})$, may comprise time series data having higher resolution than the averaged data used for training the physics-based model. The resolution of the time-series data may be, for example, in the order en minutes or seconds.

A further feature realized by the disclosed embodiments is that the model for solar generation estimation/prediction can work also in case of existence of behind-the-meter battery energy storage systems (BESS) without any additional modeling effort. In this scenario, $P_{net} = P_c - P_{PV} \pm P_{BESS}$, where $P_{BESS}$ is battery charging/discharging power. However, the model according to the disclosed embodiments considers only an average daily pattern and the daily average net power exchange does not significantly change with the effect of BESS. This is because behind-the-meter BESS in distribution grids are typically not long-duration storages and mostly have one full or well-matched charge/discharge cycles during a day, i.e., $|\overline{P}_{BESS}| \approx 0$.

Since the disclosed embodiments do not assume any knowledge of installed PV capacity, they can be used to not only quantitively estimate/predict the aggregate solar generation behind a node but also to detect the presence of PV installations behind the node. The output 406 of the solar generation estimator/predictor 404 may be used by a grid operator (DSO) for various purposes, such as demand-side management, for example, scheduling of short-term operations implemented by the grid operator (including controlling/curtailing of some PVs), as well as for other applications, such as cost-efficient transformer/substation sizing, line planning, risk analysis, situational awareness, etc.

Figure 5:
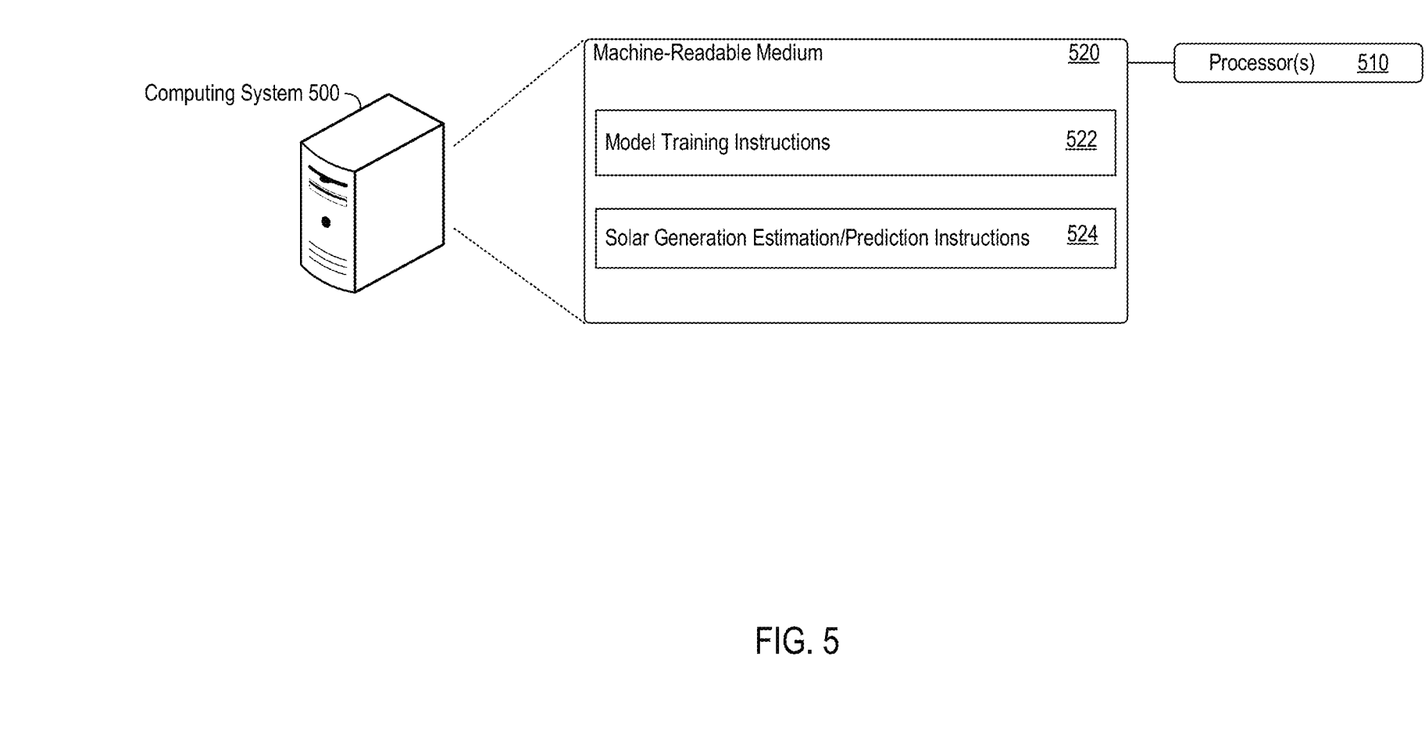
FIG. 5 illustrates a computing system that can support solar energy disaggregation at a node of a distribution system according to disclosed embodiments.

FIG. 5 shows an example of a computing system 500 that can support solar energy disaggregation at a node of a distribution system according to disclosed embodiments. The computing system 500 may, for example, be part of a distributed energy resource management system. The computing system 500 includes at least one processor 510, which may take the form of a single or multiple processors. The processor(s) 510 may include a central processing unit (CPU), a graphics processing unit (GPU), a neural processing unit (NPU), a microprocessor, or any hardware device suitable for executing instructions stored on a memory comprising a machine-readable medium. The computing system 500 further includes a machine-readable medium 520. The machine-readable medium 520 may take the form of any non-transitory electronic, magnetic, optical, or other physical storage device that stores executable instructions, such as model training instructions 522 and solar generation estimation/prediction instructions 524, as shown in FIG. 5. As such, the machine-readable medium 520 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 500 may execute instructions stored on the machine-readable medium 520 through the processor(s) 510. Executing the instructions (e.g., the model training instructions 522 and the solar generation estimation/ prediction instructions 524) may cause the computing system 500 to perform any of the technical features described herein, including according to any of the features of the model trainer 210 and the solar generation estimator/predictor 404 described above.

The systems, methods, devices, and logic described above, including the model trainer 210 and the solar generation estimator/predictor 404 modules, may be implemented in many different ways in many different combinations of hardware, logic, circuitry, and executable instructions stored on a machine-readable medium. For example, these modules may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the model trainer 210 and the solar generation estimator/predictor 404. Computer readable program instructions described herein can be downloaded to respective computing/processing devices from a computer readable storage medium or to an external computer or external storage device via a network, for example, the Internet, a local area network, a wide area network and/or a wireless network.

The processing capability of the systems, devices, and modules described herein, including the model trainer 210 and the solar generation estimator/predictor 404, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

Although this disclosure has been described with reference to particular embodiments, it is to be understood that the embodiments and variations shown and described herein are for illustration purposes only. Modifications to the current design may be implemented by those skilled in the art, without departing from the scope of the patent claims.

What is claimed is:

1. A computer-implemented method for estimating or predicting an aggregate solar generation at a node of a distribution system, the method comprising:
   obtaining, by a computing system comprising one or more processors, first data pertaining to a net power measured by a meter installed at the node, the first data comprising a number of samples of net power averaged over a defined interval,
   obtaining, by the computing system, second data pertaining to a solar irradiation local to the node, the second data comprising a number of samples of solar irradiation averaged over intervals temporally correlated with the first data,
   training, by the computing system, a physics-based model of the node using the first and second data, to optimize a set of model parameters, the physics-based model being defined such that an average net power includes a composite of an average solar generation and an average power consumption at the node and the average solar generation is modeled as a function of an average solar irradiation, and
   estimating or predicting, by the computing system, an aggregate solar generation at the node from an input respectively comprising actual irradiation data or irradiation forecast data local to the node, using a model parameter optimized by the training.

2. The method according to claim 1, wherein the interval for averaging includes a one-day interval or a multiple thereof.

3. The method according to claim 1, wherein the actual irradiation data or irradiation forecast data, and respectively the estimated solar generation or predicted solar generation at the node, comprise time series data having higher resolution than the averaged data used for training the physics-based model.

4. The method according to claim 1,
   wherein the average power consumption in the physics-based model is modeled as a function of a base power consumption,
   wherein the physics-based model comprises a regression model and the set of model parameters optimized comprises a first model parameter including the base power consumption and a second model parameter including a coefficient defining a linear relationship between the average solar irradiation and the average solar generation at the node, and
   wherein the optimized second model parameter is used for estimating or predicting the aggregate solar generation at the node from the input comprising respectively the actual irradiation data or the irradiation forecast data local to the node.

5. The method according to claim 4, wherein the second parameter comprises multiple components assigned to respectively multiple intervals of average irradiation over a day.

6. The method according to claim 4, wherein the second parameter comprises multiple components assigned to respectively multiple types of irradiation, the multiple types of irradiation selected from the group consisting of: direct irradiation, diffuse irradiation and reflected irradiation.

7. The method according to claim 1, further comprising:
obtaining, by the computing system, third data pertaining to a temperature local to the node, the third data comprising a number of samples of temperature averaged over intervals temporally correlated with the first data, and
training, by the computing system, the physics-based model using the first, second and third data, the physics-based model being defined such that the average power consumption at the node is modeled as a function of an average temperature.

8. The method according to claim 7,
wherein the average power consumption at the node is modeled as a sum of a base power consumption and an average temperature dependent power consumption at the node,
wherein the physics-based model comprises a regression model and the set of model parameters optimized comprises a first model parameter including the base power consumption, a second model parameter including a coefficient defining a linear relationship between the average solar irradiation and the average solar generation at the node, and a third model parameter including a coefficient defining a relationship between the average temperature and the average temperature dependent power consumption, and
wherein the optimized second model parameter is used for estimating or predicting the aggregate solar generation at the node from the input comprising respectively the actual irradiation data or the irradiation forecast data local to the node.

9. The method according to claim 8, wherein the third model parameter defines a linear relationship between the average temperature and the average temperature dependent power consumption.

10. The method according to claim 9, wherein the third model parameter comprises a first component defining a relationship between the average temperature and the average temperature dependent power consumption when the average temperature is above a threshold temperature, and a second component defining a relationship between the average temperature and the average temperature dependent power consumption when the average temperature is below the threshold temperature.

11. A non-transitory computer-readable storage medium including instructions that, when processed by a computing system, configure the computing system to perform the method according to claim 1.

12. A computing system for estimating or predicting an aggregate solar generation at a node of a distribution system, the computing system comprising:
one or more processors,
a non-transitory memory in communication with the one or more processors, the non-transitory memory including algorithmic modules executable by the one or more processors, the algorithmic modules comprising:
a model trainer configured to:
obtain first data pertaining to a net power measured by a meter installed at the node, the first data comprising a number of samples of net power averaged over a defined interval,
obtain second data pertaining to a solar irradiation local to the node, the second data comprising a number of samples of solar irradiation averaged over intervals temporally correlated with the first data, and
train a physics-based model of the node using the first and second data, to optimize a set of model parameters, the physics-based model being defined such that an average net power includes a composite of an average solar generation and an average power consumption at the node and the average solar generation is modeled as a function of an average solar irradiation, and,
a solar generation estimator/predictor configured to estimate or predict an aggregate solar generation at the node from an input respectively comprising actual irradiation data or irradiation forecast data local to the node, using a model parameter optimized by the training.

* * * * *